US009134728B2

(12) United States Patent
Hanking

(10) Patent No.: US 9,134,728 B2
(45) Date of Patent: Sep. 15, 2015

(54) SYSTEM AND METHOD FOR THE LOSS-FREE PROCESSING OF PROCESS VALUES OF A TECHNICAL INSTALLATION OR A TECHNICAL PROCESS

(75) Inventor: Heino Hanking, Minden (DE)

(73) Assignee: ABB TECHNOLOGY AG, Zurich (CH)

(*) Notice: Subject to any disclaimer, the term of this patent is extended or adjusted under 35 U.S.C. 154(b) by 767 days.

(21) Appl. No.: 12/465,388

(22) Filed: May 13, 2009

(65) Prior Publication Data
US 2009/0287727 A1 Nov. 19, 2009

Related U.S. Application Data

(63) Continuation of application No. PCT/EP2007/009559, filed on Nov. 5, 2007.

(30) Foreign Application Priority Data

Nov. 13, 2006 (DE) .......................... 10 2006 053 699
Aug. 29, 2007 (DE) .......................... 10 2007 040 675

(51) Int. Cl.
G06F 7/00 (2006.01)
G06F 17/00 (2006.01)
G05B 23/02 (2006.01)

(52) U.S. Cl.
CPC .................................. G05B 23/0264 (2013.01)

(58) Field of Classification Search
CPC ................ G06F 17/30153; G06F 17/30312; G06F 11/1469
USPC .................................................. 707/687, 693
See application file for complete search history.

(56) References Cited

U.S. PATENT DOCUMENTS

| 5,479,587 | A | * | 12/1995 | Campbell et al. ............ 358/1.17 |
| 5,897,621 | A | * | 4/1999 | Boesch et al. ............ 705/26.82 |
| 7,720,818 | B1 | * | 5/2010 | Laura ............................. 707/661 |
| 2003/0130933 | A1 | * | 7/2003 | Huang et al. .................... 705/38 |
| 2004/0054551 | A1 | * | 3/2004 | Ausubel et al. ................... 705/1 |
| 2005/0086090 | A1 | * | 4/2005 | Abrahams et al. ................ 705/7 |
| 2005/0251276 | A1 | | 11/2005 | Shen et al. |
| 2006/0106508 | A1 | | 5/2006 | Liebl et al. |
| 2007/0005630 | A1 | * | 1/2007 | Selca et al. .................... 707/102 |

(Continued)

OTHER PUBLICATIONS

D.C. Barr, "The Use of a Data Historian to Extend Plant Life", Life Management of Power Plants, IEEE, Dec. 12-14, 1994, pp. 35-39, Conference Publication No. 401.

(Continued)

Primary Examiner — Rehana Perveen
Assistant Examiner — Huen Wong
(74) Attorney, Agent, or Firm — Buchanan Ingersoll & Rooney PC

(57) ABSTRACT

The disclosure relates to a method and a system for the loss-free processing of process values which can be integrated into a process control system of a technical installation or of a technical process. The method and system can include process values acquired as raw data by means of an acquisition unit. A physical unit and a measuring range are associated with the respective process value and the acquired raw data are used to generate archivable data. The archivable data in the predetermined tolerance range can be selected by an archive function and are stored in a history server in a raw data format.

22 Claims, 4 Drawing Sheets

(56) References Cited

U.S. PATENT DOCUMENTS

2009/0089209 A1* 4/2009 Bixler et al. .................... 705/40
2011/0238553 A1* 9/2011 Raj et al. ......................... 705/37

OTHER PUBLICATIONS

International Search Report for PCT/EP2007/009559, mailed May 8, 2008.
Jens Pettersson et al., "Automatic Tuning of the Window Size in the Box Car Backslope Data Compression Algorithm", Proceedings of the 7th Mediterranean Conference on Control and Automation (MED99), Jun. 28-30, 1999, Haifa, Israel, pp. 1756-1769 (available at http://med.ee.nd.edu/MED7/med99/papers/MED101.pdf).
Swinging Door Compression, OSI Software, Inc., Apr. 1991, pp. 1-5 (available at http://training.osisoft.com/NR/rdonlyres/5547CC68-65AD-4E55-A365-B30C1FCF74F9/0/SwingingDoorCompression.doc).
"Wavelet" (available at http://en.wikipedia.org/wiki/Wavelet, printed May 13, 2009).
"LZ77 and LZ78" (available at http://en.wikipedia.org/wiki/LZ77, printed May 13, 2009).

* cited by examiner

SYSTEM AND METHOD FOR THE LOSS-FREE PROCESSING OF PROCESS VALUES OF A TECHNICAL INSTALLATION OR A TECHNICAL PROCESS

RELATED APPLICATIONS

This application claims priority as a continuation application under 35 U.S.C. §120 to PCT/EP2007/009559, which was filed as an International Application on Nov. 5, 2007 designating the U.S., and which claims priority to German Application 10 2006 053 699.1 filed in Germany on Nov. 13, 2006 and German Application 10 2007 040 675.6 filed in Germany on Aug. 9, 2007. The entire contents of these applications are hereby incorporated by reference in their entireties.

FIELD

A method and a system are disclosed for loss-free processing of process values (also referred to as process measured values or process data) of a technical process or a technical installation, used, for example, in process automation.

BACKGROUND INFORMATION

For the long-term archiving of process values (also referred to as process measured values or process data), data can be stored as a series of measurements (also referred to as measured value histories or process value histories) in a so-called history server. Archiving data can be very memory-intensive in this case. A mass memory with a very large memory area is consequently used to read the stored data, and a large number of data items are moved when processing the read data further. In this case, the data stock to be stored is composed of the product of the number of signals, their expected rate of change and their recording duration.

The process data stock which is used by the operator of the technical installation and is intended to be stored for archiving has increased greatly in recent years and there is a desire, on one hand, to store the data in a loss-free manner and, on another hand, to read the data again at a speed which is as high as possible. These desires can be fulfilled with simple storage in an uncompressed raw format. However, with this principle of raw value storage, the available mass memory is likely not used in an optimum manner. The raw data stock to be stored can, for example, be in the range of 0.5 to approximately 5 terabytes or higher, and the trend is continuing to increase based on the data stock to be stored.

Although mass memories are available for storing the volumes of data arising from the process or the installation, compression methods can be used to store large volumes of data in process automation. A compression method can be selected with a goal of achieving loss-free storage of the data and the reading of these data again at a speed which is as high as possible. A less optimum compression factor can be accepted in this case.

Loss-free or lossy methods are currently used to compress the volumes of data arising from the process or the installation.

In the known lossy compression methods, which include boxcar/backslope methods and transformation methods, the previously compressed data are available again, following decompression, with more or less severe differences with regard to the measured value and the time stamp.

The boxcar/backslope, swinging door or wavelet transformation methods are described, for example, in "Automatic Tuning of Window Size in the Box Car Backslope Data Compression Algorithm" (available at http://med.ee.nd.edu/MED7/med99/papers/MED101.pdf)
"Swinging Door Compression" (available at http://training.osisoft.com/NR/rdonlyres/5547CC68-65AD-4E55-A365-B30C1FCF74F9/0/SwingingDoorCompression.doc), and
"Wavelet" (available at http://en.wikipedia.org/wiki/Wavelet).

These methods afford a good compression rate but are not loss-free. In addition, on account of the volume of data to be processed, the reading operation is considerably slower than the operation of reading the data stored in uncompressed form.

The methods which are known from loss-free compression, such as the LZW, LZ77 or LZ78 method (in this case, a sequence of characters in the original text is replaced with a sequence of characters from another alphabet), and are described, for example, in "LZ77 and LZ78" (available at http://en.wikipedia.org/wiki/LZ77)

also provide unsatisfactory compression rates for the raw data, which are provided from the process or the installation and are intended to be stored, and can be too slow for many applications in process automation during unzipping.

However, in the so-called lossy compression methods, the compression of the data which arise is associated with a loss of information because the data which have been read or decompressed differ from the original data.

The lossy methods described above are not suitable, in particular, in the environment of process or installation information systems which often use the archived data as a billing-related basis—for example if measurements from the process environment which are as accurate as possible are used as a basis for balancing processes in the office environment, a lossy value can not be used in this case—or, on the basis of these data, subsequently analyze exactly the sampling times of the process data.

Another exemplary disadvantage of the lossy methods is based on the fact that the decompression of the data (also referred to as unzipping) can be very computation-intensive. Therefore, with the large volumes of data to be processed, compression is more likely to be a hindrance since the decompression of the data simply takes a long time.

SUMMARY

A method for loss-free processing of process values is disclosed, implemented by a process control system of a technical installation comprising: recording process values as raw data using a recording unit; generating archivable data from the raw data of a given process value after a physical unit and a measuring range have been assigned to the given process value; selecting the archivable data in a predefined tolerance band using an archiving function; storing the selected data in a raw data format in a history server; compressing the selected data in the raw data format continuously using a time delay with respect to their storage in the history server and using a coding module provided by the history server; decompressing the compressed data, following a request from the process control system, using a decoding module provided by the history server; and transmitting the decompressed data provided by the decoding module and further available data in the raw data format to a display module for further processing.

A system for the loss-free processing of process values is disclosed, comprising: a recording device which records process values of a technical process as raw data; a processing unit which interacts via the recording device, wherein the processing unit generates archivable data from the recorded raw data after a physical unit and a measuring range have been assigned to each respective process value, and wherein the processing unit interacts with an archiving function which checks whether the archivable data exceed a predefined tolerance band, selects the archivable data within the tolerance band, and stores the archivable data in a raw data format in a history server; a coding module of the history server which continuously compresses selected data in the raw data format with a time delay with respect to storage in the history server; and a decoding module which interacts with the coding module and which decompresses the data compressed by the coding module following a request, and provides a display module with the decompressed data and further available data in the raw data format for further processing.

BRIEF DESCRIPTION OF THE DRAWINGS

Exemplary embodiments and advantageous refinements and improvements thereof are described and explained in more detail using the exemplary embodiments illustrated in the Figures, in which.

DETAILED DESCRIPTION

Figure 1:
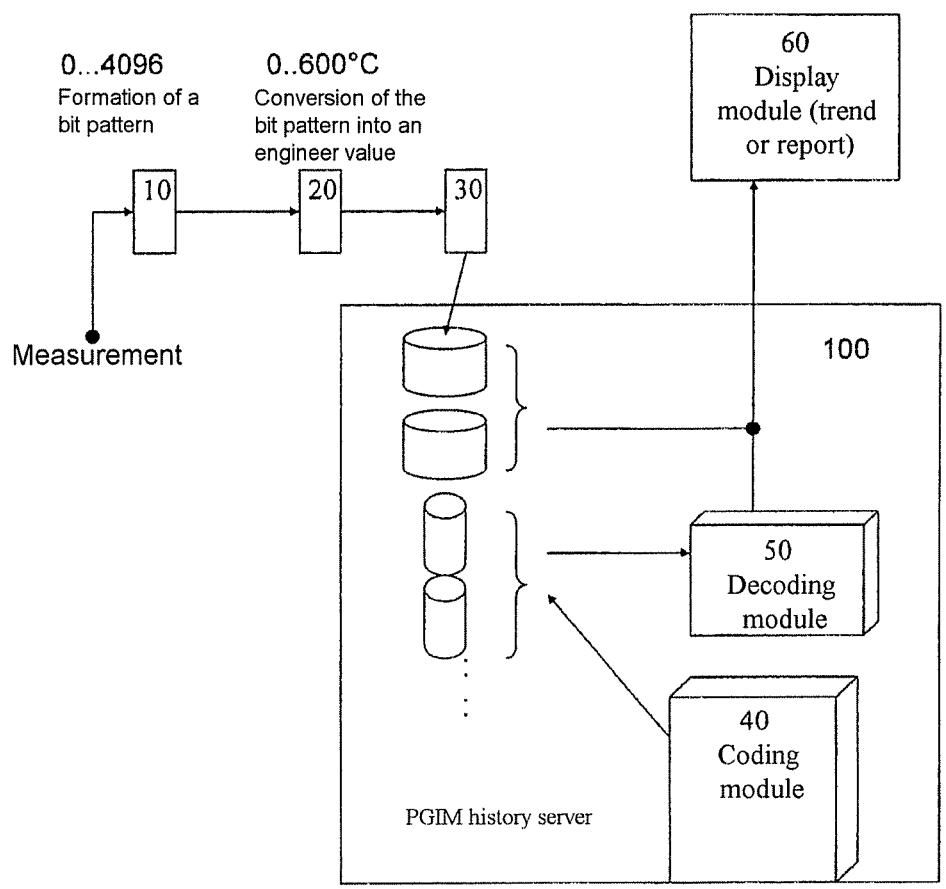
FIG. 1 shows an exemplary embodiment of a system for loss-free processing of process values of a technical installation or a technical process.

A method is disclosed for loss-free processing of process values (also referred to as process measured values or process data) of a technical process or a technical installation. A corresponding system for carrying out the method is also disclosed. In exemplary embodiments, an operation of unzipping compressed data can be accelerated. In addition, the method can be loss-free, in contrast to most known methods.

Exemplary methods disclosed herein exploit the fact that digitized process values of a technical installation are recorded with losses in order to arrive, in a downstream special loss-free compression method, at an optimum mix of compression rate and unzipping speed of process data in a process control system of a technical installation or a technical process.

According to exemplary embodiments, the process values provided from the technical installation or the technical process are recorded in the form of raw data using a recording unit, and a physical unit and a measuring range are respectively assigned to the raw data recorded.

The archivable raw data generated in this manner are checked in order to determine whether they are within a predefined tolerance band. The archivable data within the predefined tolerance band are selected using an archiving function and are stored as selected data in a history server in their original, that is to say not yet compressed, data format (also referred to as raw data format).

The history server can be a special database with real-time functions for collecting process or measurement data for long-term storage and for archiving the collected data, the collected data being stored on a hard disk of a protocol memory at defined intervals of time.

The selected data in the raw data format can be compressed with a time delay with respect to their storage in the history server using a coding module provided by the history server, a compressed file being generated from the compressed data.

In order to provide the process control system with the data in the compressed file for further processing, for example in order to display the progression of a process value over a predefined time range, the data in the compressed file can be decompressed, following a request, using a decoding module provided by the history server. The request to decompress the compressed file and to provide further available data in the raw data format can be provided by the process control system automatically or on the basis of an event.

The decompressed data provided by the decoding module and further data in the raw data format which have been read in from the process or from the installation during the generation of the compressed file can be transmitted, for example to a display module, for further processing.

An exemplary method as disclosed herein can be used to improve, for example, the long-term archiving of process value histories, which are formed from the continuously recorded process values, to the effect that not only are the process values compressed in a loss-free manner but also the best possible packing density of the compressed data is achieved. In contrast to the lossy methods, all billing-related data can be restored exactly without losing their original information.

The raw data are stored in the history server in their original uncompressed data format, in a manner split in terms of time into respective independent files for each measured value, for example, into so-called two-day files, without compressing the raw data.

An exemplary operation of storing the raw data in the history server using special techniques is described below.

The historical series of measured values should be respectively stored in a history server for thousands of different measuring points (also referred to as signals). Treating these historical series of measured values for a measuring point as individual sub-databases makes it possible to effectively store the historical series of measured values in a standard file system as follows: a separate folder in the file system is used for each signal sub-database or series of measured values for a signal. The signal sub-databases can thus be distributed among any desired number of hard disks to, for example, achieve even better performance and additional redundancy aspects.

Furthermore, a short-term read/write cache can be introduced in the RAM for every signal. The short-term read/write cache is already "visible" to the internal SQL engine, as a result of which the values for client queries are available without delay.

So-called "hard-disk-friendly" emptying of the short-term read/write cache is controlled by introducing a cache flush process. In this respect, the cache flush process causes the cache contents to be completely written back to a main memory. The signal cache which is now empty is then available again for recording the next values.

The cache flush process also controls an individual dynamic cache size on the basis of the signal speed. For example, the so-called fast signals are assigned many values per unit of time. These signals are allocated larger short-term caches. In contrast, slow signals gradually give up their cache memory to fast signals.

The cache flush process which is thus time-controlled and capacity-controlled operates in such a manner that as few data access operations as possible are used or the data access operation is distributed as evenly as possible. This can advantageously result in optimum performance when reading and writing the data even in standard file systems such as the New Technology File System (NTFS).

The compression method carried out using the coding module can operate independently in a concurrent process and codes the raw data with a delay with respect to the actual archiving, that is to say the process values are first stored in the raw data format and are gradually converted into a compressed format with a configurable delay in this concurrent process, a compressed file being generated from the compressed data.

A resultant advantage is based on the fact that the temporal delay in the compression of the raw data can be controlled in such a manner that raw values are used, for example, over a relatively long period of time because access operations are increasingly requested in this period of time, for example when creating daily reports and trends, and it is thus possible to access the storage medium without decoding and thus in a rapid manner in this case.

The temporal delay in the compression of the raw data can advantageously be set individually for individual process values or groups or classes of process values. For example, a class of billing-related data is kept in the raw data format for several years before the compression of these data is started.

From the above knowledge, a further concurrent process (KompressDelayKonfigurator module) can now be instructed to automatically determine the compression delays and runs according to the following principle:

The history server can internally provide access statistics for each signal. These access statistics comprise, for example, who has accessed the individual time series with which history periods with respect to the current time. The KompressDelayKonfigurator module determines an optimum delay time on the basis of these data.

Figure 2:
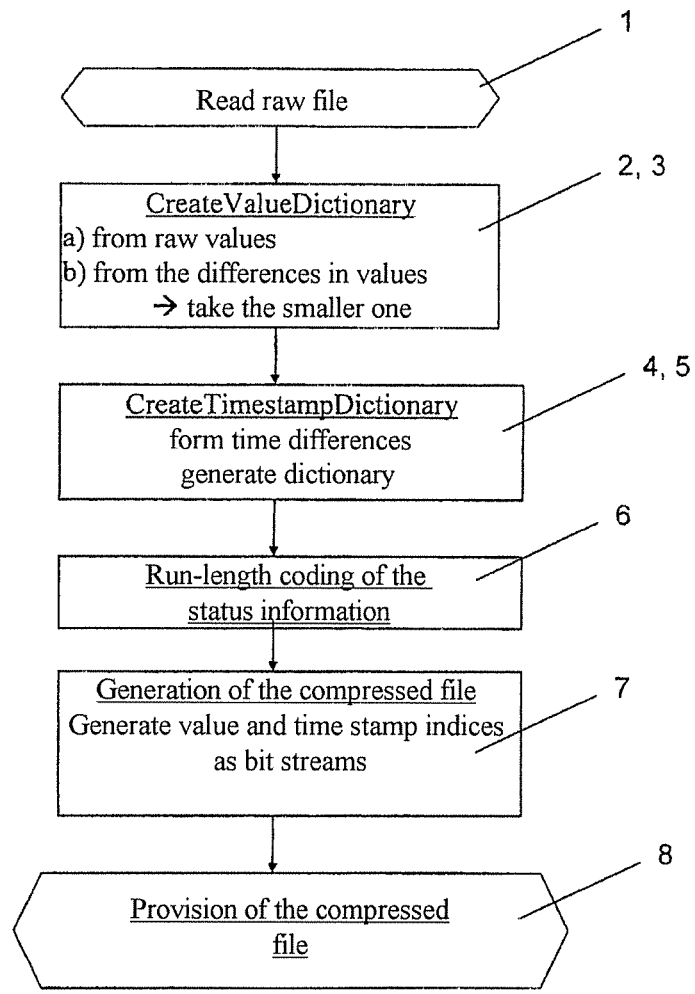
FIG. 2 shows an exemplary method sequence for loss-free compression of process values of a technical installation or a technical process.
Figure 3:
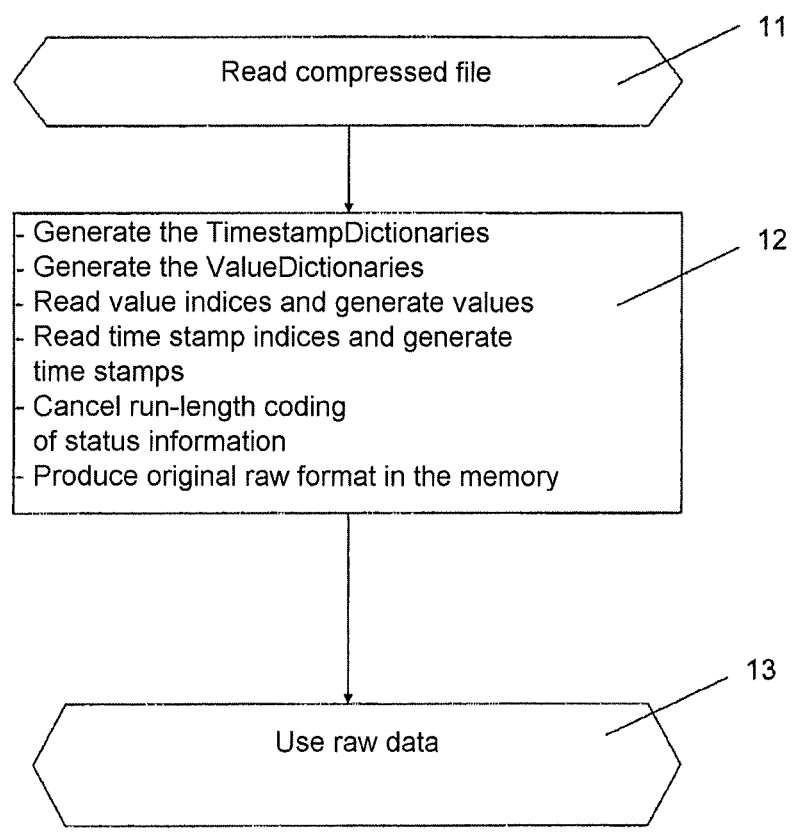
FIG. 3 shows an exemplary method sequence for decompressing the compressed file.

Another exemplary advantage is based on a fast-running unzipping algorithm for the compressed data, which algorithm corresponds to the reversal of the zipping algorithm described in FIG. 2 and of the unzipping algorithm described in FIG. 3, as a result of which the speed when unzipping the compressed data can be considerably reduced without restricting the function of the history server in the process.

An exemplary system for the loss-free processing of process values can be integrated in a process control system of a technical installation or a technical process, and comprises a recording device which records the process values provided from the process or the installation in the form of raw data. The recording unit interacts with a processing unit which generates archivable data from the recorded raw data after a physical unit and a measuring range have been assigned to the respective process value.

The processing unit can interact with an archiving function which checks whether the archivable data exceed a predefined tolerance band. The archiving function thus checks every incoming process value in order to determine whether the latter exceeds the predefined tolerance band. The archiving function also selects the archivable data within the tolerance band and stores the selected data in a raw data format without compression, that is to say each incoming process value which is within the predefined tolerance band is stored in a history server in the form of a raw value, for example in the two-day files in the raw data format comprising a time stamp, a value in the IEEE double format and a status in the 16-bit integer format (file type which stores integer values).

The history server has a coding module for compressing the selected data. The coding module continuously compresses the selected data in the raw data format with a time delay with respect to their storage in the history server.

The coding process which takes place in a decoupled and individually delayed manner in the history server can now gradually compress the data stored in the raw data format.

Following an automatic or event-based request, the compressed data can be directly supplied to a decoding module for decompression, and a display module, for example a module for displaying trends, can be provided with the decompressed data and further available data in the raw data format for further processing and/or display.

Exemplary systems and methods disclosed herein can be used for the long-term archiving of series of measurements in automation technology.

FIG. 1 shows an embodiment of an exemplary system for the loss-free processing of process values, which system can be integrated in a process control system of a technical installation or a technical process.

An exemplary system comprises a recording device 10 which can be formed as an input/output unit with a resolution of, for example, 12 bits, that is to say a bit pattern which corresponds to a range of numbers from 0 to 4096 is generated from a measured voltage. The recording device 10 can thus record the process values provided from the process or the installation in the form of digital data. Archivable data can be generated using a processing unit 20, which is connected to the recording unit 10, by respectively converting the recorded process values in the form of raw data into a so-called engineer value. For this purpose, the process values can be each assigned a physical unit (for example ° C.) and a measuring range (for example 0 to 600° C.) and the numerical value recorded by the input/output unit 10 can be accordingly transformed, for example by obtaining 300° C. from the recorded value 2048 in the present example, the number 300 being available to the system as an IEEE double value.

An archiving function 30 integrated in the system can check each raw value, which has been provided by the recording unit 10 and has been converted into an engineer value, in order to determine whether said value exceeds a predefined tolerance band and then stores this raw value in two-day files in the raw data format, the raw value having a time stamp, a value in the IEEE double format and a status in the 16-bit integer format.

The following table 1 shows an exemplary structure of the raw data file, the number of bytes corresponding to the product of the number of process values with 18 bytes for each measured value. In the following example, each file contains the values from a maximum of two days.

TABLE 1

| Time stamp | Data value | Data type |
| --- | --- | --- |
| Time stamp (IEEE double, 64 bits) | Value (IEEE double, 64 bits) | Status (16 bits) |
| Time stamp (IEEE double, 64 bits) | Value (IEEE double, 64 bits) | Status (16 bits) |
| Time stamp (IEEE double, 64 bits) | Value (IEEE double, 64 bits) | Status (16 bits) |
| Time stamp (IEEE double, 64 bits) | Value (IEEE double, 64 bits) | Status (16 bits) |
| Time stamp (IEEE double, 64 bits) | Value (IEEE double, 64 bits) | Status (16 bits) |

The data provided by the technical process or the technical installation can be stored in the form of raw data in a history server 100, in a manner split in terms of time into independent files for each measuring point, without compressing the data.

A coding module 40 can be integrated in the history server 100, which coding module gradually compresses the raw data stored in the raw data format in a decoupled and individual manner, as a result of which the raw data are converted into a compressed format in a parallel manner and independently of their actual archiving.

The coding module 40 interacts with a decoding module 50 which is likewise integrated in the history server 100. The decoding module 50 is provided for the purpose of unzipping the data compressed by the coding module 40 following a request from the process control system. A display module 60 is provided, which depicts a trend or a report, for example, with the unzipped data and further available data in the raw data format for further processing.

When reading the data from the coding module 40, for example in order to display a long-term trend or a report, the compressed or zipped data can be converted using the decoding module 50 and, like the raw data which are still available and together with the latter, are sent to the trend or the report 60.

FIG. 2 shows an exemplary method sequence for the loss-free compression of process values of a technical installation or a technical process.

On the basis of the structure described above and the contents of the raw files and the order in which the data are produced, the coding methods described below are used to compress the raw data.

In an exemplary embodiment, the raw data which have been read in by the recording unit 10 in a first step 1 and are stored in the form of process values in the IEEE double format are still based on digital values with a resolution of, for example, 12 bits on account of the recording chain implemented by the recording unit 10 and the processing unit 20.

Consequently, with 12 bits, a maximum of 4096 different values can be expected to occur in a file. Only the calculated values formed by arithmetical operations during processing are exceptions. These have an increased range of values but only by a factor of 3. A tolerance band during recording can be controlled in such a manner that one or two further bits are filtered, thus correspondingly lowering the expected volume of data or values.

According to an exemplary embodiment, the raw values from the file are processed, in a second step 2 in a CreateValueDictionary, in a first directory in such a manner that only the directory indices are stored.

In a third step 3, a second directory of all occurring differences in values is created from two respective raw values. Since the values are unlikely to change suddenly between two raw values, there is a high degree of probability that the second directory will contain even fewer values than the first directory. Both directories are now compared with one another and the directory having the fewest values is selected and is provided for further processing in the form of a measured value directory (ValueDictionary).

A similar procedure can be carried out for the time resolution in a fourth step 4 in a CreateTimestampDictionary. When storing the raw values from the process, the time resolution can be accurately stamped to the exact millisecond. In addition, approximately the same time differences occur in a file. In the CreateTimestampDictionary, all time stamps are thus first converted into milliseconds in principle and the corresponding differences (referred to as time differences below) are then formed. A directory of the time differences, the time stamp directory (TimestampDictionary), is created therefrom.

When zipping the time stamp directory in a fifth step 5, the effect described below becomes important. When reading in fast signals, the corresponding values can be provided in a relatively continuous manner; for example a new value is read in a time range of 0.5 to 0.8 seconds. Consequently, it can be assumed that most time differences are in a close difference time window and virtually all millisecond numbers are thus present in the time stamp directory in this range. The time stamp directory can be therefore sorted in ascending order before the bit coding of the value indices begins, and the corresponding time differences are formed. In this case, so-called long single chains of the ascending values are produced, which are, in turn, quickly compressed using run-length coding.

Run-length coding can be a very simple loss-free compression algorithm for the data in digital form and can be particularly well suited to representing repetitions or sequences of identical values in abbreviated form. If there is a repetition, the number of repetitions and the repeated value are stored.

In one refinement, the units of time are coded in advance in the form of differences. The slower a signal, that is to say the fewer changes the signal has, the greater and more different the time differences between the values. Consequently, the time stamp directory grows even though there is a smaller number of values or data items for a corresponding signal. The units of time can be immediately coded as time differences on account of the increased need for data for the units of time from the time stamp directory together with the indices to be coded. The processing of a directory can be thus advantageously saved by determining the bits required for the coding from the maximum time difference. In this case, the coding module 40 selects the directory with the more compact format.

In a sixth step 6, a check is carried out during the time coding in order to determine whether converting the bytes in the longitudinal direction is more effective under certain circumstances: since all times are ascending times, long chains of identical bytes, which can be compressed in a very effective manner using the above-described run-length coding, are likewise produced in this case. This procedure can be particularly advantageous if there are very irregular and few data items per file.

The above-described run-length coding can be likewise carried out for the status information (16-bit integer).

In a further step 7, the indices for the values can be coded in addition to the measured value directory which has already been created and the time stamp directory which has been created in the compressed file. For example, it has been found that coding according to the conventionally used Shannon-Fano or Huffman methods does not provide any better results and partly provides even somewhat worse results than a rigidly determined bit field size.

In this case, Shannon-Fano coding and Huffman coding are based on a type of entropy coding which assigns a sequence of bits of differing length to each individual character in a text. Since a particular minimum number of bits is needed to distinguish all characters from one another, the number of bits assigned to the characters cannot be limitlessly small.

The constant coding scheme which is now used and in which the same number of bits is always used for an index also has the advantage that the coding scheme is unzipped considerably faster since there is no need to run through a binary tree in order to form the corresponding index.

An exemplary compressed file generated in this manner in a final step 8 has the structure shown in table 2:

TABLE 2

Differential starting values and pointers to all structure blocks
Directory of time differences
Directory of differences in values
Bit-coded time indices
Bit-coded time indices
Run-length-coded status information The compression achieved in this manner can reduce the raw data from approximately 100% to approximately 18-32%, which corresponds to a factor of 3 to 5 which is used to reduce the volume of raw data. If the compression which has already been previously achieved by means of the tolerance band and corresponds approximately to a factor of 2 to 6 in the reduction of the volume of raw data is taken into account, a maximum total compression of approximately thirty times (approximately 5*6=30) the original volume of raw data results, exemplary mean values which can be achieved being at a factor of 8.

An exemplary advantage of the systems and methods disclosed herein is based on the fact that, although the upstream tolerance band represents lossy compression, the billing-related data can be clearly restored since the abovementioned method steps 2 to 7 are carried out only after the archivable data within the predefined tolerance band have been selected.

The determination of the billing-related data at the run time, which can be carried out in an installation information system, can have exactly the same result as the values determined in the compressed history.

In order to provide the installation information system with the data in the compressed file for further processing, for example in order to display the progression of a process value over a predefined time range, the data in the compressed file can be decompressed, following a request from the installation information system, using the decoding module 50 provided by the history server 100 according to the method sequence illustrated in FIG. 3.

FIG. 3 shows an exemplary method sequence for decompressing the compressed file, the compressed file generated being read by the decoding module 50 in a first method step 11.

In a subsequent step 12, the time stamp directory (TimestampDictionary) and the measured value directory (ValueDictionary) are generated and the value indices and time stamp indices are read from the history server 100 and values and time stamps are generated. After the run-length-coded status information has been decoded, the data are restored in their raw data format.

In a final step 13, the decompressed data in their raw data format, which have been provided by the decoding module 50 in this manner, and further data in the raw data format, which have been read in during the generation of the compressed file, are transmitted to a display module 60 for further processing.

When reading the decompressed data, which have been provided by the decoding module 50, from the compressed area, for example in order to display a long-term trend, the zipped data are thus converted using the decoding module 50 and are sent to the trend 60 together with the raw data which are still available.

Figure 4:
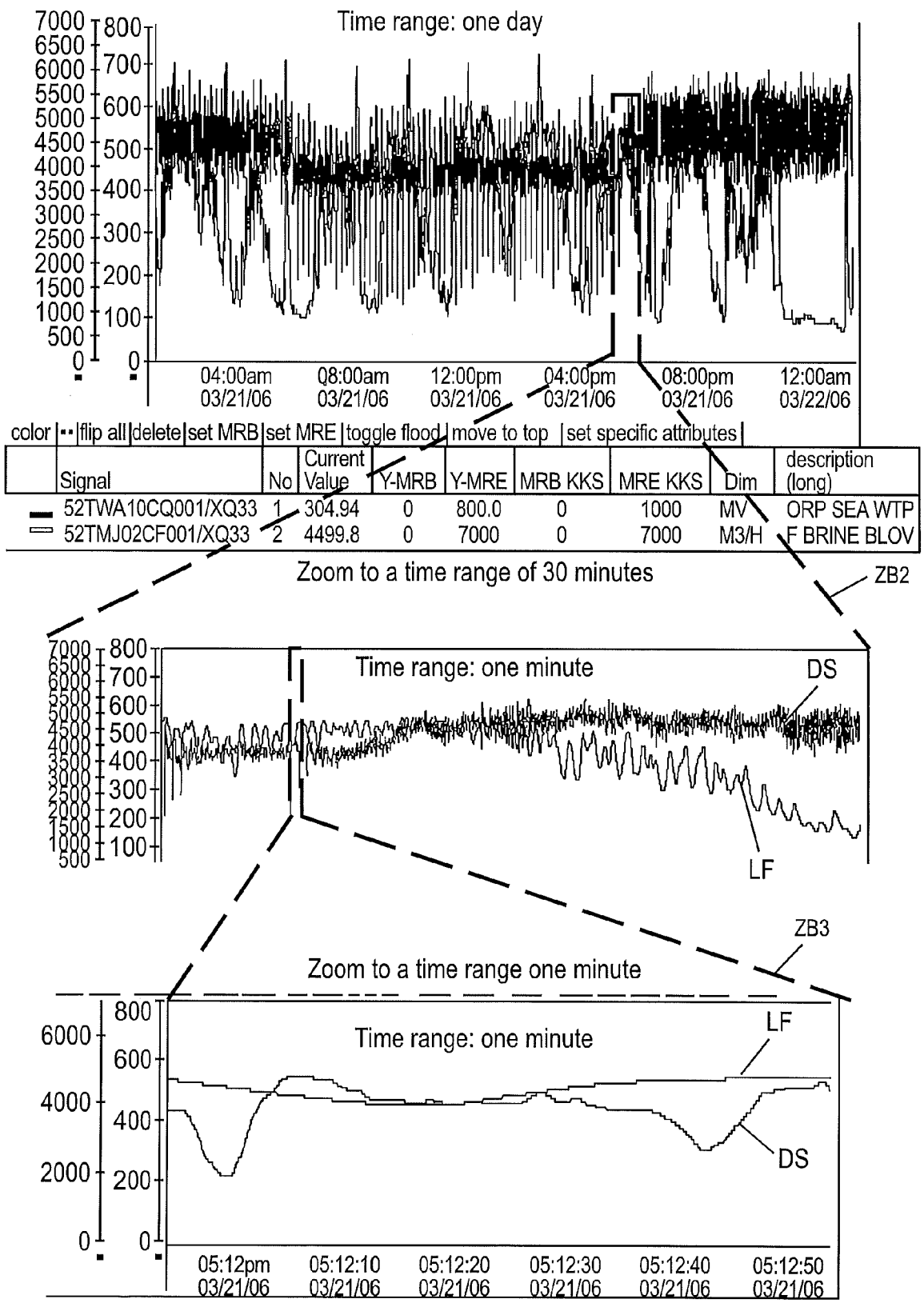
FIG. 4 shows an exemplary progression of selected process or signal values and corresponding compression results for different time ranges.

FIG. 4 shows an exemplary progression of selected process or signal values and corresponding compression results for one day, for an exemplary time range of 30 minutes and for an exemplary time range of one minute using the example of a relatively fast pressure signal DS (Ta=250 ms) and a conductivity measurement of the salt content LF of a sea water desalination installation which produces an exemplary moderately fast signal (Ta=1 sec).

The following table 3 shows exemplary results of the compression of the signal profiles illustrated in FIG. 4:

TABLE 3

| Curve | Raw triple | dt. Dict | v. Dict | dv. Dict | dt. bits | v. bits | dv. bits | % dt-v | % dt-dv | % S&F dt-dv | % Win Zip |
|---|---|---|---|---|---|---|---|---|---|---|---|
| DS | 178304 | 3539 | 2408 | 515 | 13 | 12 | 10 | 22.4 | 20.6 | 19.7 | 49.7 |
| LF | 16704 | 7195 | 2081 | 76 | 13 | 12 | 7 | 22.3 | 27.8 | 27.3 | 52.8 |

The abbreviations used in Table 3 can be gathered from the following list:
Raw triple: number of time/value/status triples which are included in 2-day files and represent the data base of the signal profiles DS, LF
dt. Dict: all included time differences
v. Dict: all included values
dv. Dict: all included differences in values
dt. bits: bits for an index which are required for time coding
v. bits: bits for an index which are required for value coding
dv. bits: bits for an index which are required for differential value coding
% dt-v: compression rate achieved in %, including Time/Value Dictionary
% dt-dv: compression rate achieved in % if differential values are coded
% WinZip: compression rate achieved with WinZip in % as a comparison It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for loss-free processing of process measured values, implemented by a process control system of a technical installation comprising:
   measuring process values from the technical installation;
   recording the process measured values as raw data using a recording unit;
   generating archivable data from the raw data of a given process measured value after a physical unit and a measuring range have been assigned to the given process measured value;
   determining whether the archivable data exceeds a predefined tolerance band and selecting the archivable data within the predefined tolerance band using an archiving function;

storing the selected archivable data in a raw data format in a history server, wherein indices of the archivable raw data are stored as first entries in a first directory and differences among the archivable raw data are stored as second entries in a second directory, and wherein a time resolution of each raw data value is stored as first entries in a third directory and differences among the time resolutions are stored as second entries in a fourth directory;

selecting one of the first and second directories as a selected directory having a fewest number of values among the two directories;

selecting one of the third directory and the fourth directory having smaller time differences among the entries;

compressing the data in the selected directory among the third and fourth directories in the raw data format continuously based on a time delay with respect to storage of the selected data in the history server, wherein a coding module in the history server performs the compression, and, wherein the time delay is set individually for individual process measured values or for groups or classes of process measured values;

decompressing the compressed data, following a request from the process control system, using a decoding module provided by the history server; and transmitting the decompressed data provided by the decoding module and further available data in the raw data format to a display module for further processing, wherein the time delay for compressing the selected data is determined automatically as an optimum time delay based on access statistics of the process measured values.

2. The method as claimed in claim 1, comprising:
providing the request to decompress the compressed data and to provide further available data in the raw data format by the process control system automatically or based on an event.

3. The method as claimed in claim 1, comprising:
storing the data in the raw data format in the history server, in a manner split in terms of time into independent files for each measuring point, without compression.

4. The method as claimed in claim 1, comprising:
storing the process measured values in the raw data format; and converting the stored process measured values gradually, in a temporally offset manner, into a compressed format with a configurable delay.

5. The method as claimed in claim 1, comprising:
outputting, via a module for displaying a trend or a module for depicting a report, the decompressed data and further available data in the raw data format.

6. A system for the loss-free processing of process measured values, comprising:
a recording device which records process measured values of a technical process as raw data;
a processing unit which interacts via the recording device, wherein the processing unit generates archivable data from the recorded raw data after a physical unit and a measuring range have been assigned to each respective process measured value, and wherein the processing unit interacts with an archiving function which checks whether the archivable data exceeds a predefined tolerance band, selects the archivable data within the tolerance band, stores the archivable data in a raw data format in a history server such that indices of the selected archivable data are stored as first entries in a first directory and differences among the selected archivable data are stored as second entries in a second directory, stores a time resolution of each raw data value as first entries in a third directory and differences among the time resolutions as second entries in a fourth directory, selects one of the first and second directories as a selected directed having a fewest number of values among the two directories, and selects one of the third directory and the fourth directory having smaller time differences among the entries;

a coding module of the history server which continuously compresses data in the raw data format of the selected directory among the third and fourth directories with a time delay with respect to storage of the selected data in the history server, wherein the time delay is set individually for individual process measured values or for groups or classes of process measured values, and wherein the time delay for compressing the selected data is determined automatically as an optimum time delay based on access statistics of the process measured values; and a decoding module which interacts with the coding module and which decompresses the data compressed by the coding module following a request, and provides a display module with the decompressed data and further available data in the raw data format for further processing.

7. The system as claimed in claim 6, wherein the process control system provides the request to decompress the compressed data and to provide further available data in the raw data format automatically or on the basis of an event.

8. The system as claimed in claim 6, wherein the data in the raw data format can be stored in the history server, in a manner split in terms of time into independent files for each measuring point, without compression.

9. The system as claimed in claim 6, wherein the compression of the data in the raw data format can be individually set for individual process measured values or groups or classes of process measured values with a temporal delay.

10. The system as claimed in claim 6, wherein the history server is a database for collecting process or measurement data, messages and reports, for long-term storage and archiving of collected data, the collected data, messages and/or reports being stored at defined intervals of time.

11. The system as claimed in claim 6, wherein the history server is provided for first storing the process values in the raw data format converting the stored data into a compressed format with a configurable delay.

12. The system as claimed in claim 6, comprising:
a display module which depicts the decompressed data and the further available data in the raw data format as a trend or report.

13. The system as claimed in claim 7, wherein the data in the raw data format can be stored in the history server, in a manner split in terms of time into independent files for each measuring point, without compression.

14. The method as claimed in claim 1, wherein the history server is a database for collecting process or measurement data, messages and reports, for long-term storage and archiving of collected data, the collected data, messages and/or reports being stored at defined intervals of time.

15. The method as claimed in claim 14, wherein the history server is provided for first storing the process measured values in the raw data format and converting the stored data into a compressed format with a configurable delay.

16. The method as claimed in claim 15, comprising:
a display module which depicts the decompressed data and the further available data in the raw data format as a trend or report.

17. The method as claimed in claim 1, comprising:
  providing, at the history server, access statistics for a historical series of process measured values.

18. The system as claimed in claim 6, wherein the history server provides access statistics for a historical series of process measured values, and wherein a concurrent process automatically determines the time delays based on the access statistics.

19. The method as claimed in claim 1, wherein the access statistics includes data identifying who has accessed the process measured values within time periods with respect to a current time.

20. The system as claimed in claim 6, wherein the access statistics includes data identifying who has accessed the process measured values within time periods with respect to a current time.

21. The method as claimed in claim 1, wherein generating archivable data includes converting the raw data value into an engineer value.

22. The system as claimed in claim 6, wherein the archiving function of the processing unit is configured to convert the raw data value into an engineer value.

\* \* \* \* \*